United States Patent [19]

Isegawa et al.

[11] Patent Number: 4,990,567

[45] Date of Patent: Feb. 5, 1991

[54] MOLED AMIDE RESIN PRODUCT AND METHOD FOR ITS PREPARATION

[75] Inventors: Yo Isegawa; Makoto Watanabe, both of Yokkaichi, Japan

[73] Assignee: Mitsubishi Kasei Polytec Company, Tokyo, Japan

[21] Appl. No.: 539,386

[22] Filed: Jun. 18, 1990

Related U.S. Application Data

[63] Continuation of Ser. No. 120,983, Nov. 16, 1987, abandoned.

[30] Foreign Application Priority Data

Aug. 28, 1986 [JP]  Japan ................................ 61-214480
Nov. 18, 1986 [JP]  Japan ................................ 61-272793
Nov. 18, 1986 [JP]  Japan ................................ 61-274792

[51] Int. Cl.$^5$ ........................ C08L 77/00; C08L 77/02
[52] U.S. Cl. ...................................... 525/183; 525/66; 525/432
[58] Field of Search ................ 525/66, 183, 184, 432

[56] References Cited

U.S. PATENT DOCUMENTS 4,598,125  7/1986  Horn et al. ............................ 525/184
4,714,718  12/1987 Horn et al. ............................ 525/432
4,810,753  3/1989  Koga et al. ........................... 525/184

OTHER PUBLICATIONS

*Patent Abstracts of Japan*, (1984), vol. 8, "Production of Polyamide Copolymer".
*Patent Abstracts of Japan*, (1984), vol. 8, "Production of Polyamide".

*Primary Examiner*—Ana L. Carrillo
*Attorney, Agent, or Firm*—Oblon, Spivak, McClelland, Maier & Neustadt

[57] ABSTRACT

A molded amide resin product prepared by injecting a mixture comprising a ω-lactam, a polymerization catalyst, a polymerization cocatalyst, a modified olefin and a polyamide soluble in a molten ω-lactam into a mold at a temperature not lower than the melting point of the ω-lactam, followed by molding.

6 Claims, No Drawings

MOLDED AMIDE RESIN PRODUCT AND METHOD FOR ITS PREPARATION

This application is a continuation of application Ser. No. 07/120,983, filed on Nov. 16, 1987, now abandoned.

BACKGROUND OF THE INVENTION

1. FIELD OF THE INVENTION

The present invention relates to a molded amide resin product and a method for its preparation. Particularly, it relates to a molded product by reaction injection of an amide resin and a method for its preparation. More particularly, it relates to a molded product having excellent mechanical properties at room temperature and low temperatures, little dimensional change and little deterioration in the rigidity due to absorption of water, and an excellent outer appearance, and a method for its preparation.

2. DISCUSSION OF BACKGROUND

In recent years, a so-called reaction injection molding (hereinafter referred to simply as "RIM") has been proposed as a method for obtaining a molded product, wherein a highly reactive liquid material is injected into a mold, followed by the polymerization reaction of the liquid material, and RIM is expected to be a highly prospective technique.

The RIM technique was practically developed in the field for the production of molded products from polyurethanes. Recently however, the same technique has been applied also to base materials such as amide resins, unsaturated polyester resins or epoxy resins. Among them, amide resins are expected to be particularly useful for RIM since they have merits such that they are excellent in toughness, heat resistance, electrical properties, friction resistance and abrasion resistance, they are moldable under low injection pressure since the flowability of the starting material composition is good, they are moldable into any desired shapes ranging from thin molded products to thick molded products, the transferability of the mold surface is good, and the polymerization reaction can be easily accomplished since heat generation during the polymerization is little.

However, the amide resins are inadequate in the impact resistance at low temperatures. Further, since they have high water absorptivity, the deterioration in the rigidity and the dimensional change of the molded product are substantial. Further, they have a drawback that the heat resistance is inadequate for baking finish. It has been proposed to incorporate a certain block copolymer to the amide resin to overcome such drawbacks (Japanese Examined Patent Publication No. 40120/1979). According to this proposal, however, the deterioration in the rigidity is substantial although the impact resistance at low temperatures is improved. As another method for overcoming the above drawbacks, it has been proposed to add a filler to the amide resin. However, the impact resistance at a low temperature will not be improved by this method, although the deterioration in the rigidity and the dimensional change of the molded product due to water absorption will be reduced and the heat resistance can be improved.

As still another method for overcoming the above drawbacks, it has been proposed to add an aromatic polyamide to the amide resin. However, this method has a drawback that the molded product tends to have poor impact resistance although it is possible to suppress the water absorptivity by this method.

SUMMARY OF THE INVENTION

It is an object of the present invention to provide a molded amide resin product which is a molded product obtained by the RIM technique by using $\omega$-lactam as the starting material and which is free from the above-mentioned drawbacks and a method for its preparation. Namely, it is an object of the present invention to provide a molded amide resin product (1) having excellent mechanical properties at room temperature and at low temperature, (2) having little dimensional change and deterioration in the rigidity due to absorption of water, (3) having heat resistance sufficient to be durable during baking finish treatment and (4) having an excellent outer appearance, and a method for its preparation.

In a first aspect, the present invention provides a molded amide resin product prepared by injecting a mixture comprising a $\omega$-lactam, a polymerization catalyst, a polymerization cocatalyst, a modified olefin and a polyamide soluble in a molten $\omega$-lactam into a mold at a temperature not lower than the melting point of the $\omega$-lactam, followed by molding.

In a second aspect, the present invention provides a method for preparing a molded amide resin product, which comprises incorporating a polyamide soluble in a molten $\omega$-lactam having a modified polyolefin preliminarily incorporated and dispersed therein to at least one of a $\omega$-lactam melt containing a polymerization catalyst (hereinafter referred to as component A) and a $\omega$-lactam melt containing a polymerization cocatalyst (hereinafter referred to as component B), then mixing components A and B, and injecting the mixture into a mold, followed by molding.

DETAILED DESCRIPTION OF THE PREFERRED EMBODIMENT

Now, the present invention will be described in detail with reference to the preferred embodiments.

The molded amide resin product of the present invention contains a mixture of a modified polyolefin and a polyamide soluble in a molten $\omega$-lactam and is composed of a reaction product of the $\omega$-lactam, a polymerization catalyst and a polymerization cocatalyst.

Specific examples of the $\omega$-lactam to be used in the present invention include $\gamma$-butyrolactam, $\delta$-valerolactam, $\epsilon$-caprolactam, $\omega$-enantholactam, $\omega$-capryllactam, $\omega$-undecanolactam and $\omega$-laurinlactam. These $\omega$-lactams may be used alone or in combination as a mixture of two or more.

The polymerization catalyst to be used in the present invention may be any compound selected from conventional polymerization catalysts commonly used in anion polymerization of $\omega$-lactams. Specifically, it may be an alkali metal, an alkaline earth metal or a hydride, oxide, hydroxide, carbonate, alkyl compound, aryl compound, alkoxide or Grignard compound thereof, or a reaction product of such a metal or metal compound with a $\omega$-lactam such as a sodium salt, potassium salt or magnesium halide of a $\omega$-lactam. The polymerization catalyst is used usually within a range of from 0.01 to 20 mol % or more.

The polymerization cocatalyst to be used in the present invention is also any compound selected from those commonly used for anion polymerization of $\omega$-lactams. Its specific examples include an isocyanate such as toluene diisocyanate, 4,4'-diphenylmethane diioscyanate, hexamethylene diisocyanate, a polymethylenepolyphenyl polyisocyanate or a carbodiimide-modified diisocyante; a carbamide lactam such as hexamethylene-1,6-biscarbamide, caprolactam, N,N'-diphenyl-p-phenylenebiscarbamide caprolactam, N,N'-diphenyl-p-phenylenebiscarbamide or pyrrolidone; an acid halide such as terephthaloyl chloride, adipic acid chloride or sebacic acid chloride; a polyacyl lactam such as adipoyl biscaprolactam, adipoyl bispyrrolidone, terephthaloyl biscaprolactam, terephthaloyl bispyrrolidone, isophthaloyl biscaprolactam or isophthaloyl bispyrrolidone; and compounds of the formulas:

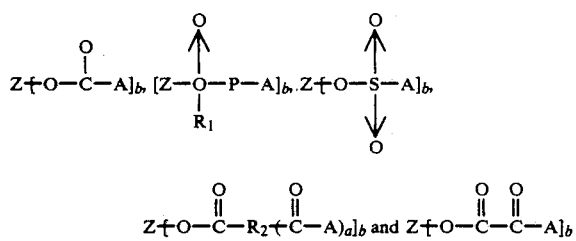

wherein A is a halogen atom or

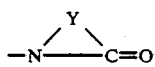

wherein Y is an alkylene group having from 3 to 11 carbon atoms, a is an integer of 1, 2 or 3, b is an integer of at least 1, $R_1$ is an alkyl group, an aralkyl group, an alkoxy group, an aryloxy group, a halogen atom or an aralkoxy group, $R_2$ is a bivalent or higher valent group selected from hydrocarbon groups and hydrocarbons having an ether bond, and Z is an acid halide functional substance or a lactam functional substance selected from the group consisting of structures derived from compounds having polyvalent hydroxyl groups, amino groups, mercapto groups or epoxy groups.

Examples of the compound having polyvalent hydroxyl groups include an alkylene glycol such as diethylene glycol, triethylene glycol, tetraethylene glycol, tetramethylene glycol, propylene glycol, dipropylene glycol, hexylene glycol, 1,3-propanediol, 1,3-hexanediol, butylene glycol, 1,4-butanediol, dicyclopentadiene glycol, heptaethylene glycol and isopropylidene bis(p-phenyleneoxypropanol-2); a polyol other than the alkylene glycol, such as glycerol, pentaerythritol, 1,2,6-hexanetriol and 1-trimethylolpropane, a polymeric polyol such as polyethylene glycol, polypropylene glycol, polyoxypropylenediol or triol, polytetramethylene glycol, caster oil, polybutadiene glycol, polyester glycol and poly(ε-caprolactone)diol, and a number of compounds containing a substituent other than a hydroxyl group, such as 2,4-dichlorobutylene glycol.

The compound having polyvalent mercapto groups includes hydroxyethyl thioglycolate, ethylene glycol bis(thioglycolate), pentaerythritoltetrakis(thioglycolate) and thioglycol.

The compound having polyvalent amino groups includes hexamethylenediamine, tolylenediamine, 2,4-diethyltolylenediamine, polyoxyethylenediamine, polyoxypropylenediamine or triamine, polyoxypropylenediamine and a copolymer polyamide having a terminal amino group.

The compound having polyvalent epoxy groups includes resorcinol diglycidyl ether, a diglycidyl ether of bisphenol A, vinylcyclohexane dioxide, butanediolglycidyl ether, a polyglycidyl ester of a polycarboxylic acid, an epoxidized polyolefin, a glycidyl ether resin and an epoxy-novolak resin.

Further, in the present invention, a compound which does not substantially interfere with the polymerization reaction, such as a plasticizer, a foaming agent, a dyestuff or pigment, an antioxidant or an internal releasing agent may be incorporated.

In the present invention, the modified polyolefin provides, together with the polyamide soluble in a molten ω-lactam which will be described hereinafter, functions to impart impact resistance at low temperatures to a molded product, to reduce the water absorptivity of a molded product and to reduce the dimensional change or the deterioration in the rigidity due to absorption of water.

Such a modified polyolefin may be an α-olefin such as ethylene, propylene, butene-1 or isobutylene or, in some cases, a copolymer which may contain a diene such as butadiene, isoprene, hexadiene or norbornadiene, to which from 0.01 to 1.0% by weight of maleic anhydride is grafted. Further, it may be a copolymer of ethylene with an α,β-unsaturated carboxylic acid such as acrylic acid or methacrylic acid, wherein from 0 to 100 mol % of the carboxylic acid contained in the copolymer is neutralized by a metal ion such as sodium, lithium, potassium, calcium or zinc. These modified polyolefins may be used alone or in combination as a mixture of two or more.

As the polyamide soluble in a molten ω-lactam, an aromatic polyamide and an aliphatic polyamide may be mentioned.

The aromatic polyamide may be, for example, a polycondensation product of a dicarboxylic acid with a diamine, where at least one of the dicarboxylic acid and the diamine contains an aromatic group. The condensation product composed of a combination of such compounds is soluble in a molten ω-lactam and provides functions to improve the mechanical properties of the molded amide resin product at low temperatures, to prevent deterioration of the physical properties due to absorption of water and to improve the heat resistance.

The dicarboxylic acid includes terephthalic acid, isophthalic acid, methylterephthalic acid, methylisophthalic acid, dimethylterephthalic acid, dimethylisophthalic acid, naphthalenedicarboxylic acid, biphenyldicarboxylic acid, bis(carboxyphenyl)propane and diphenyl ether dicarboxylic acid. Among them, terephthalic acid and isophthalic acid are preferred.

The diamine includes aliphatic diamines such as ethylenediamine, tetramethylenediamine, hexamethylenediamine, octamethylenediamine and decamethylenediamine, and other diamines such as m-xylenediamine, p-xylenediamine, bis(3-methyl-4-aminocyclohexyl)methane, 4,4'-diaminodicyclohexylmethane and 3,3'-dimethyl-4,4'-diaminodicyclohexylmethane. Among them, hexamethylenediamine, 4,4'-diaminodicyclohexylmethane and bis-(3-methyl-4-aminocyclohexyl)methane are preferred.

The above-mentioned aromatic polyamide is a condensation product of the dicarboxylic acid and the diamine. It is preferred that at least one of the dicarboxylic acid and the diamine contains an aromatic group. Particularly preferred among the aromatic polyamides is a polycondensation product comprising from 85 to 100 parts by weight of semi-aromatic polyamide forming units composed of an aliphatic diamine and isophthalic acid and/or terephthalic acid and from 0 to 15% by weight of aliphatic polyamide forming units.

Such an aromatic polyamide may be produced by a conventional method by properly selecting the combination of the above dicarboxylic acid and the above diamine.

The aliphatic polyamide soluble in a molten ω-lactam may be a copolymer composed of at least three compounds selected from at least three groups selected from the following four groups of compounds for constituting a polyamide:

(a) aliphatic dicarboxylic acids,
(b) aliphatic diamines,
(c) aminocarboxylic acids, and
(d) lactams.

The aliphatic dicarboxylic acids (a) as one of the groups of compounds, include malonic acid, succinic acid, glutaric acid, adipic acid, pimeric acid, suberic acid, azelaic acid, sebacic acid, ε-methyladipic acid, cork acid, decamethylene dicarboxylic acid, dodecamethylene dicarboxylic acid and 1,10-decane dicaboxylic acid. Among this group (a), adipic acid and sebacic acid are preferred.

The aliphatic diamines (b) may be the same aliphatic diamines as mentioned for the preparation of the aromatic polyamide. Among them, hexamethylene diamine is preferred.

The aminocarboxylic acids (c) as a group of compounds include 6-aminocaproic acid, 7-aminoenanthic acid, 9-aminononanoic acid, 11-aminoundecanoic acid and 17-aminoheptadecanoic acid.

The lactams (d) as a group of compounds include ε-caprolactam, enantholactam, ε-capryllactam, ε-undecanolactam, ω-laurinlactam, decyl lactam and undecyl lactam.

The copolymer composed of at least three compounds selected from at least three groups among the four groups of compounds (a) to (d), can readily be prepared by a conventional polycondensation method for the production of polyamides. A condensation product by a combination of such compounds, is soluble in a molten ω-lactam and performs functions to improve the moldability during the molding operation and to improve the rigidity or the mechanical properties at low temperatures, of the molded amide resin product.

In the production of the molded amide resin product of the present invention, the above-mentioned modified polyolefin is preliminarily incorporated and dispersed in the polyamide. The amount of the modified polyolefin incorporated to the polyamide is selected within a range of from 10 to 60% by weight, based on 100% by weight of the total amount of both compounds. If the amount of the modified polyolefin exceeds 60% by weight, the polyamide tends to be hardly dissolved in a molten ω-lactam, such being undesirable. The amount of the modified polyolefin is preferably selected within a range of from 20 to 55% by weight within the above-mentioned range.

To disperse the modified polyolefin to the polyamide, prescribed amounts of the two materials are dry-blended to obtain a mixture, which is then kneaded in a molten state by an application of a high shearing force. For this purpose, it is preferred to employ e.g. a twin-screw extruder. As a result of experiments conducted by the present inventors, it has been found that in order to effectively accomplish the object of the present invention, the modified polyolefin dispersed in the polyamide preferably has a particle size within a range of from 0.1 to 3 μm.

Now, a method for preparing a molded polyamide resin product of the present invention will be described.

Firstly, a polymerization catalyst is added to a ω-lactam, and the mixture is heated to a temperature of not lower than the melting point of the ω-lactam (e.g. at least 70° C. when the ω-lactam is ε-caprolactam) to obtain a ω-lactam- melt containing the polymerization catalyst (which will be referred to as component A). Likewise, a polymerization cocatalyst is added to a ω-lactam, and the mixture is heated to a temperature of not lower than the melting point of the ω-lactam to obtain a ω-lactam melt containing the polymerization cocatalyst (which will be referred to as component B).

Then, a polyamide soluble in a molten ω-lactam having a modified polyolefin incorporated and dispersed therein is incorporated to at least one of components A and B. The amount of the polyamide having the modified polyolefin dispersed therein is selected within a range of from 1 to 50% by weight relative to 100% by weight of the total amount of components A and B and the polyamide having the modified polyolefin dispersed therein. Within the range, it is preferred to select an amount within a range of from 15 to 40% by weight. To component A or B, other additives such as a crosslinking agent, a modifier, a plasticizer, a coloring agent or an antioxidant, may be incorporated, as the case requires, to obtain a molding composition. When the polyamide having the modified polyolefin dispersed therein is incorporated to both components A and B, their proportions are suitably determined taking into account the type of the ω-lactam and the viscosities of components A and B.

Then, molten components A and B are mixed in a predetermined ratio, and the resulting mixture of molding composition is injected or poured into a mold. The mixing ratio of components A and B here may appropriately be selected within a range of the volume ratio of component A/component B being from 5/1 to 1/5 depending upon the particular purpose of the molded product and upon the desired properties. The two components may be mixed by using a fluid mixing apparatus such as a static mixer or a dynamic mixer, or an impingement mixing apparatus so-called a mixing head.

The mold temperature for the preparation of a molded product is usually within a range of from 100° to 200° C., preferably from 120° to 160° C. When the mold temperature is maintained within the above range, the polymerization reaction proceeds quickly in the mold, and the injected mixture will be cured and solidified. Thus, the polymerization reaction can be completed in a short period of time (usually within from 2 to 4 minutes) after the injection of the mixture of molding composition into the mold. After completion of the polymerization reaction, the mold is cooled, and the product will be taken out of the mold to obtain the desired molded amide resin product.

Components A and B are heated, mixed and injected under sealing with an inert gas. The inert gas used for sealing will be partially contained in the melt and consequently will be contained in a molded product, and it serves to prevent shrink mark and thus improve the outer appearance of the molded product.

The molded amide resin product of the present invention includes parts of vehicles such as an exterior plate of an automobile or a snowmobile, a steering wheel, a dash panel, an instrumental panel, a cowl panel, a cowl grille, an armrest and a bumper; housings or portable casing of office appliances such as a computer, a wordprocesser and a typewriter; parts and housings for household electrical appliances such as a television and a sound appliance; insulating materials for various other electrical appliances, parts of household equipments, parts of agricultural machines, plastic pallets or plastic sheets. However, the present invention is by no means restricted to these specific examples.

As described in the foregoing, the present invention provides the following particularly remarkable effects, and its value for industrial application is very high.

(1) According to the method of the present invention a polyamide soluble in a molten ω-lactam having a modified polyolefin preliminarily dispersed therein is incorporated to at least one of components A and B. The ω-lactam melt having such a polyamide incorporated therein has good flowability and excellent stability, whereby the handling is easy and the injection into a mold for molding can easily be conducted.

(2) The molded amide resin product of the present invention contains the modified polyolefin and the polyamide soluble in a molten ω-lactam, whereby it is excellent in the mechanical properties at room temperature and it is also excellent in the impact resistance at low temperatures.

(3) The molded amide resin product of the present invention contains the modified polyolefin and the polyamide soluble in a molten ω-lactam, whereby water absorptivity is reduced. Accordingly, decrease in the rigidity due to water absorption or dimensional change due to water absorption is minimum.

(4) The molded amide resin product of the present invention contains the polyamide soluble in a molten ω-lactam, whereby it is superior in the heat resistance when subjected to baking finish.

(5) The molded amide resin product according to the present invention scarcely has pinholes, voides and agglomerations of air bubbles on the surface of the molded product, whereby irregularities on the molded product due to these defects scarcely result, whereby the outer appearance will be excellent.

Now, the present invention will be described in further detail with reference to Examples and Comparative Examples. However, it should be understood that the present invention is by no means restricted to such specific Examples.

Aromatic polyamides soluble in a molten ω-lactam having a modified polyolefin preliminarily dispersed therein (hereinafter referred to simply as "Aromatic nylon-APO") and aliphatic polyamides (hereinafter referred to simply as "aliphatic nylon-APO") used in the following Examples are as follows.

AROMATIC NYLON-APO I

Pellets of a modified polyolefin obtained by grafting 0.4% by weight of maleic anhydride to a copolymer of ethylene, prolylene and 1,4-butadiene (crystallinity: 20%, melt index (MI): 5 g/10 min at 190° C.) in a weight ratio of ethylene/propylene/1,4-butadiene =91/15/4 and pellets of an aromatic polyamide obtained by polycondensation of terephthalic acid, isophthalic acid and hexamethylenediamine in a weight ratio of 33/17/50 and having a number average molecular weight of about 10,000 as measured by GPC (gel permeation chromatography) by using a mixture of m-cresol/chloroform (weight ratio: ¼) as a solvent, were blended in a weight ratio of 30/70 by a blender.

The mixture thus obtained was kneaded by a 50 mm twin-screw extruder (TEM-50, manufactured by Toshiba Kikai K.K.) at a screw rotational speed of 220 rpm by setting the cylinder temperature at 190° C., 200° C., 210° C. and 220° C. from the hopper side to the die side, followed by pelletizing to obtain Aromatic nylon-APO I. The average particle size of the modified polyolefin dispersed in the aromatic polyamide was 0.3 μm.

AROMATIC NYLON-APO II

Pellets of a modified polyolefin prepared by grafting 0.4% by weight of maleic anhydride to a copolymer of ethylene, butene-1 and 1,4-butadiene (crystallinity: 20%, MI: 4 g/10 min at 190° C.) in a weight ratio of ethylene/butene-1/1,4-butadiene=81/14/5 and pellets of an aromatic polyamide obtained by polycondensation of terephthalic acid, isophthalic acid and 4,4'-diaminodicyclohexylmethane in a weight ratio of 33/17/50 and having a number average molecular weight of about 15,000 as measured in the same manner as mentioned above, were blended in a weight ratio of 30/70 by a blender.

The mixture thus obtained was kneaded under the same condition by using the same 50 mm twin-screw extruder as in the case of Aromatic nylon-APO I, followed by pelletizing. The average particle size of the modified polyolefin dispersed in the aromatic polyamide was 0.3 μm.

AROMATIC NYLON III

Aromatic nylon-APO III was prepared in the same manner as in the preparation of Aromatic nylon-APO I except that the weight ratio of modified polyolefin/Aromatic nylon in the combination for Aromatic nylon-APO I was changed to 40/60.

The average particle size of the modified polyolefin dispersed in the aromatic polyamide was 0.5 μm.

AROMATIC NYLON-APO IV

Pellets of a modified polyolefin prepared by grafting 0.4% by weight of maleic anhydride to a copolymer of ethylene, propylene and 1,4-butadiene (crystallinity: 20%, MI: 5 g/10 min at 190° C.) in a weight ratio of ethylene/propylene/1,4-butadiene=91/15/4 and pellets of an aromatic polyamide obtained by polycondensation of terephthalic acid, isophthalic acid and bis-(3-methyl-4-aminocyclohexyl)methane in a weight ratio of 33/17/50 and having a number average molecular weight of about 10,000 as measured by GPC by using the a mixture of m-cresol/chloroform in a weight ratio of ¼ as the solvent, were blended in a weight ratio of 30/70 by a blender.

The mixture thus obtained was kneaded by a 50 ml twin-screw extruder (TEM-50, manufactured by Toshiba Kikai K.K.) at a screw rotational speed of 220 rpm by setting the cylinder temperature at 210°, 250° C., 270° and 270° C. from the hopper side to the die side, followed by pelletizing to obtain Aromatic nylon-APO IV. The average particle size of the modified polyolefin dispersed in the aromatic polyamide was 0.3 μm.

AROMATIC NYLON-APO V

Pellets of a modified polyolefin prepared by grafting 0.4% by weight of maleic anhydride to a copolymer of ethylene, butene-1 and 1,4-butadiene (crystallinity: 20% MI: 4 g/10 min at 190° C.) in a weight ratio of ethylene/butene-1/1,4-butadiene=81/14/5 and pellets of an aromatic polyamide prepared by polycondensation of terephthalic acid, isophthalic acid, bis-(3-methyl-4-aminocyclohexyl)methane and hexamethylenediamine in a weight ratio of 33/17/25/25 and having a number average molecular weight of about 15,000 as measured in the same manner as mentioned above, were blended in a weight ratio of 30/70 by a blender.

The mixture thus obtained was kneaded under the same condition by using the same 50 mm twin-screw extruder as used in the case of Aromatic nylon-APO I to obtain pellets. The average particle size of the modified polyolefin dispersed in the aromatic polymaide was 0.3 μm.

AROMATIC NYLON-APO VI

Pellets of a modified polyolefin obtained by grafting 0.4% by weight of maleic anhydride to a copolymer of ethylene, propylene, and 1,4-butadiene (crystallinity: 20%, MI: 5 g/10 min at 190° C.) in a weight ratio of ethylene/propylene/1,4-butadiene=91/15/4 and pellets of an aromatic polyamide prepared by pclycondensation of terephthalic acid, isophthalic acid, hexamethylenediamide and e-caprolactam in a weight ratio of 32/16/48/4 and having a number average molecular weight of about 10,000 as measured by GPC by using a mixture of m-cresol/chloroform in a weight ratio of ¼ as the solvent, were blended in a weight ratio of 30/70 by a blender.

The mixture thus obtained was kneaded and pelletized under the same condition by using the same 50 mm twin-screw extruder as used in the case of Aromatic nylon-APO I. The average particle size of the modified polyolefin dispersed in the aromatic polyamide was 0.3 μm.

AROMATIC NYLON-APO VII

Pellets of a modified polyorefin prepared by grafting 0.4% by weight of maleic anhydride to a copolymer of ethylene, butene-1 and 1,4-butadiene (crystallinity: 20%, MI: 4g/10 min at 190° C.) in a weight ratio of ethylene/butene-1/1,4-butadiene=81/14/5 and pellets of an aromatic polyamide prepared by polycondensation of terephthalic acid, isophthalic acid, hexamethylenediamine and ε-caprolactam in a weight ratio of 30/15/45/10 and having a number average molecular weight of about 15,000 as measured in the same manner as above, were blended in a weight ratio of 30/70 by a blender.

The mixture thus obtained was kneaded and pelletized under the same condition by using the same 50 ml twin-screw extruder as used in the case of Aromatic nylon-APO I. The average particle size of the modified polyolefin dispersed in the aromatic polyamide was 0.3 μm.

AROMATIC NYLON-APO VIII

Aromatic nylon-APO VIII was prepared in the same manner as in the case of Aromatic nylon-APO VI except that the weight ratio of the modified polyolefin/the Aromatic nylon was changed to 40/60.

The average particle size of the modified polyolefin dispersed in the aromatic polyamide was 0.5 μm.

ALIPHATIC NYLON-APO I

Pellets of a modified polyolefin prepared by grafting 0.4% by weight of maleic anhydride to a copolymer of ethylene and propylene (crystallinity: 20%, MI: 12 g/10 min at 190° C.) in a weight ratio of ethylene/propylene =85/15 and pellets of an aliphatic polyamide which was a copolymer comprising four compound components of caprolactam, hexamethylenediamine, adipic acid and sebacic acid and which as represented by a polyamide, had a weight ratio of nylon 6/nylon 66/nylon 610 =60/25/15 and a number average of molecular weight of about 30,000 as measured by GPC by using a mixture of m-cresol/chloroform in a weight ratio of ¼, were blended in a weight ratio of 40/60 by a blender.

The mixture thus obtained was kneaded and pelletized under the same condition by using the same 50 mm twin-screw extruder as used in the case of Aromatic nylon-APO I. The average particle size of the modified polyolefin dispersed in the aliphatic polyamide was 0.3 μm.

ALIPHATIC NYLON-APO II

Pellets of a modified polyolefin obtained by grafting 0.4% by weight of maleic anhydride to a copolymer of ethylene and butene-1 (crystallinity: 20%, MI: 18 g/10 min at 190° C.) in a weight ratio of ethylene/butene-1 =86/14 and pellets of an aliphatic polyamide which was a copolymer comprising four compound components of caprolactam, laurinlactam, hexamethylenediamine and lauric acid and which, as represented as a polyamide, had a weight ratio of nylon 6/nylon 12/nylon 612 =1/1/1 and a number average molecular weight of about 21,000 as measured in the same manner as above, were blended in a weight ratio of 50/50 by a blender.

The mixture thus obtained was kneaded and pelletized under the same condition by using the same 50 mm twin-screw extruder as used in the case of nylon-APO I. The average particle size of the modified polyolefin dispersed in the aliphatic polyamide was 0.3 μm.

With respect to the molded products obtained in the following Examples, the low temperature impact resistance (Dupont impact values), the flexural rigidity (flexural modulus), the coefficient of expansion upon water absorption, the heat resistance (heat sag), the porosity and the outer appearance were evaluated as follows:

LOW TEMPERATURE IMPACT RESISTANCE (DUPONT IMPACT VALUE)

A test piece was cut out from a plate-like molded product obtained in an Example or a Comparative Example. This test piece was permitted to absorb moisture to saturation at 23° C. under a relative humidity of 50%, and then left to stand in a low temperature chamber at −30° C. for 6 hours. Then, the impact value was measured in accordance with JIS (Japanese Industrial Standard) K-5400 by a Dupont Impact Tester. The diameter of a dart used in this test was 12.7 mm, and the diameter of the receiving hole on the test piece was 12.7 mm.

FLEXURAL RIGIDITY (FLEXURAL MODULUS)

Two types of test pieces were cut out from a plate-like molded product i.e. one type in a direction parallel to the flow direction of the molding composition when the molding composition was injected into the mold and the other type in a direction perpendicular to the flow direction of the molding composition. These test pieces were permitted to absorb moisture to saturation at 23° C. under a relative humidity of 50%. Then, the flexural modulus was measured in accordance with ASTM D-790.

COEFFICIENT OF EXPANSION UPON WATER ABSORPTION (WA EXPANSION)

A test piece having a length of 15 cm and a width of 2 cm was cut out from a plate-like molded product in a dried state, and the length (L) was accurately measured. This test piece was left to stand at 50° C. under a relative humidity of 95% for 48 hours, and then the length (L') was measured immediately after the withdrawal. The coefficient of expansion upon water absorption (hereinafter referred to simply as "WA Expansion") was calculated by the following equation.

$$WA\ Expansion(\%) = \frac{L' - L}{L} \times 100$$

HEAT RESISTANCE (HEAT SAG)

A test piece having the length of 125 mm and a width of 20 mm was cut out from a plate-like molded product in a dried state. One end of the test piece was fixed for 25 mm by a fixing jig to let the rest of 10 cm protrude freely. Then, the sagging degree (mm) of the free end of the test piece at a temperature of 160° C. was measured in accordance with ASTM D 3769-81.

POROSITY

A test piece was cut out from a plate-like molded product in a dried state, and the specific gravity was measured in accordance with JIS K-6911. The porosity was calculated by the following equation.

$$Porosity(\%) = \frac{True\ specific\ gravity - Specific\ gravity\ of\ test\ piece}{True\ specific\ gravity} \times 100$$

SURFACE OUTER APPEARANCE

The surface of the molded product was examined primarily by naked eyes, but the evaluation was made with assistance of a surface roughness meter (Model SE-3A, manufactured by Kosaka Kenkyusho K.K.).

The evaluation was made on the basis of the following four ratings:

◉: Excellent
○ : Good
Δ: Fair
×: No good

EXAMPLE 1

Components A and B having the following compositions were prepared in the respective maintaining tanks and sealed respectively with nitrogen gas under 1 kg/cm² under stirring, while maintaining component A at 90° C. and component B at 130° C.

| Component A: | |
|---|---|
| ε-caprolactam | 27.3 wt % |
| Sodium pyrrolidone | 0.7 wt % |
| Aromatic nylon-APO I | 8 wt % |
| Component B: | |
| ε-caprolactam | 37.5 wt % |
| Terephthaloylbiscaprolactam | 1.5 wt % |
| Aromatic nylon-APO I | 25 wt % |

Then, components A and B were blended to form a molding composition by a reaction injection molding machine, and the molding composition was injected into a mold having a cavity of 300 mm in length, 300 mm in width and 3 mm in depth and controlled at a temperature 140° C. by an electric heater from a gate located at the center of the longitudinal direction and held for two minutes. Then, the mold was cooled and opened, and the molded product was taken out to obtain the desired molded amide resin product.

The molded product thus obtained was tested for physical properties, and the results are shown in Table 1.

COMPARATIVE EXAMPLE 1

A molded product was prepared in the same manner as in Example 1 except that the compositions of components A and B were changed as identified below.

| Component A: | |
|---|---|
| ε-caprolactam | 35.3 wt % |
| Sodium pyrrolidone | 0.3 wt % |
| Component B: | |
| ε-caprolactam | 52.5 wt % |
| Terephthaloylbiscaprolactam | 1.5 wt % |
| Polypropylene glycol | 10 wt % |

The molded product thus obtained was tested for physical properties, and the results are shown in Table 1.

EXAMPLE 2

A molded product was prepared in the same manner as in Example 1 except that the compositions of components A and B were changed as identified below.

| Component A: | |
|---|---|
| ε-caprolactam | 25 wt % |
| Bromo magnesium caprolactam | 3 wt % |
| Aromatic nylon-APO I | 8 wt % |
| Component B: | |
| ε-caprolactam | 37.5 wt % |
| Isophthaloylbiscaprolactam | 1.5 wt % |
| Aromatic nylon-APO I | 25 wt % |

The molded product thus obtained was tested for physical properties, and the results are shown in Table 1

EXAMPLE 3

A molded product was prepared in the same manner as in Example 1 except that the compositions of components A and B were changed as identified below.

| Component A: | |
|---|---|
| ε-caprolactam | 28 wt % |
| Bromo magnesium caprolactam | 3 wt % |
| Aromatic nylon-APO I | 5 wt % |
| Component B | |
| ε-caprolactam | 47.5 wt % |
| Isophthaloylbiscaprolactam | 1.5 wt % |
| Aromatic nylon-APO I | 15 wt % |

EXAMPLE 4

A molded product was prepared in the same manner as in Example 1 except that the compositions of components A and B were changed as identified below.

| Component A: | |
|---|---|
| ε-caprolactam | 23 wt % |
| Bromo magnesium caprolactam | 3 wt % |
| Aromatic nylon-APO I | 10 wt % |
| Component B: | |
| ε-caprolactam | 32.5 wt % |
| Isophthaloylbiscaprolactam | 1.5 wt % |
| Aromatic nylon-APO I | 30 wt % |

The molded product thus obtained was tested for physical properties, and the results are shown in Table 1.

EXAMPLE 5

A molded product was prepared in the same manner as in Example 2 except that Aromatic nylon-APO II was used instead of Aromatic nylon-ApO I in Example 2.

The molded product thus obtained was tested for physical properties, and the results are shown in Table 1.

EXAMPLE 6

A molded product was prepared in the same manner as in Example 1 except that the compositions of components A and B were changed as identified below.

| Component A: | |
|---|---|
| ε-caprolactam | 25 wt % |
| Bromo magnesium caprolactam | 3 wt % |
| Aromatic nylon-APO I | 8 wt % |
| Component B: | |
| ε-caprolactam | 37.5 wt % |
| Isophthaloylbiscaprolactam | 1.5 wt % |
| Aromatic nylon-APO III | 25 wt % |

The molded product thus obtained was tested for the physical properties, and the results are shown in Table 1.

COMPARATIVE EXAMPLE 2

A molded product was prepared in the same manner as in Example 1 except that the compositions of components A and B were changed as identified below.

| Component A: | |
|---|---|
| ε-caprolactam | 47 wt % |
| Bromo magnesium caprolactam | 3 wt % |
| Component B: | |
| ε-caprolactam | 27.7 wt % |
| Polymerization cocatalyst (X) | 22.3 wt % |

Here, the polymerization cocatalyst (X) is a compound of the formula:

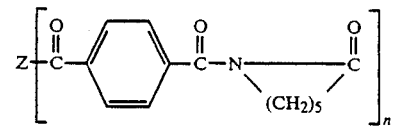

wherein the Z is a polyether having a molecular weight of about 6,000 and n is an integer of at least 2 with an average of 2.3.

The molded product thus obtained was tested for physical properties, and the results are shown in Table 1.

COMPARATIVE EXAMPLE 3

A molded product was prepared in the same manner as in Example 1 except that the compositions of components A and B were changed as identified below.

| Component A: | |
|---|---|
| ε-caprolactam | 38 wt % |
| Bromo magnesium caprolactam | 2 wt % |
| Component B: | |
| ε-caprolactam | 14.4 wt % |
| Polymerization cocatalyst (X) | 15.6 wt % |
| Milled glass fiber | 30 wt % |

Here, the milled glass fiber is a fiber having a diameter of 11 μm and an average length of 150 μm with its surface subjected to surface treatment with γ-aminopropyltriethoxysilane.

The molded product thus obtained was tested for physical properties, and the results are shown in Table 1.

COMPARATIVE EXAMPLE 4

A molded product was prepared in the same manner as in Example 2 except that an Aromatic nylon having no modified polyolefin dispersed therein (obtained by polycondensation of three components of terephthalic acid, isophthalic acid and hexamethylenediamine in a weight ratio of 33/17/50) was used instead of Aromatic nylon-APO I in Example 2.

The molded product thus obtained was tested for physical properties, and the results are shown in Table 1.

COMPARATIVE EXAMPLE 5

A molded product was prepared in the same manner as in Example 2 except that ε-caprolactam was used instead of Aromatic nylon-APO I in Example 2.

The molded product thus obtained was tested for physical properties, and the results are shown in Table 1.

TABLE 1

| | Ex. 1 | Com. Ex. 1 | Ex. 2 | Ex. 3 | Ex. 4 | Ex. 5 | Ex. 6 | Com. Ex. 2 | Com. Ex. 3 | Com. Ex. 4 | Com. Ex. 5 |
|---|---|---|---|---|---|---|---|---|---|---|---|
| Aromatic nylon-APO I | 33 | — | 33 | 20 | 40 | — | — | — | — | — | — |
| Aromatic nylon-APO II | — | — | — | — | — | 33 | — | — | — | — | — |
| Aromatic nylon-APO III | — | — | — | — | — | — | 33 | — | — | — | — |
| Polypropylene glycol | — | 10 | — | — | — | — | — | — | — | — | — |
| Polymerization cocatalyst (X) | — | — | — | — | — | — | — | 22.3 | 15.6 | — | — |
| Milled glass fiber *1 | — | — | — | — | — | — | — | — | 30 | — | — |
| Aromatic nylon *2 | — | — | — | — | — | — | — | — | — | 33 | — |
| Dupont impact value (kg.cm) | 20 | 22 | 25 | 9 | 27 | 23 | 35 | 25 | 2 | 2 | 3 |
| Flexural modulus // *3 | 1.8 | 0.6 | 2.5 | 2.2 | 3.1 | 2.4 | 2.2 | 0.8 | 1.7 | 2.7 | 1.3 |
| (kg/cm²) ⊥ *4 | 1.8 | 0.6 | 2.5 | 2.2 | 3.0 | 2.4 | 2.2 | 0.8 | 1.1 | 2.6 | 1.2 |

TABLE 1-continued

|  | Ex. 1 | Com. Ex. 1 | Ex. 2 | Ex. 3 | Ex. 4 | Ex. 5 | Ex. 6 | Com. Ex. 2 | Com. Ex. 3 | Com. Ex. 4 | Com. Ex. 5 |
|---|---|---|---|---|---|---|---|---|---|---|---|
| Heat resistance (heat sag) (mm) | 1.6 | 8.0 | 1.3 | 1.3 | 0.9 | 1.5 | 1.3 | 6.5 | 0.4 | 0.9 | 1.5 |
| WA Expansion (%) // | 0.6 | 2.0 | 0.3 | 0.6 | 0.2 | 0.3 | 0.4 | 1.4 | 0.6 | 0.2 | 1.4 |
| ⊥ | 0.6 | 2.0 | 0.3 | 0.6 | 0.2 | 0.3 | 0.3 | 1.4 | 1.2 | 0.2 | 1.4 |
| Porosity (%) | 5.3 | 5.3 | 5.3 | 5.3 | 5.3 | 5.3 | 5.3 | 5.3 | 5.3 | 5.3 | 5.3 |
| Surface outer appearance | ◎ | ○ | ◎ | ◎ | ◎ | ◎ | ◎ | ○ | △ | ◎ | ○ |

Notes:
*1: The fiber diameter was 11 μm, the average fiber length was 150 μm, and the surface was treated with γ-aminopropyltriethoxysilane.
*2: Similar to Aromatic nylon-APO I but no modified polyolefin was dispersed therein. The same applies in Table 2.
*3: Direction parallel to the flow direction of the molding composition. The same applies to Table 2.
*4: Direction perpendicular to the flow direction of the molding composition. The same applies to Table 2.

From Table 1, the following are evident:
(1) The molded amide resin products of the present invention have excellent impact resistance at low temperatures (Examples 1-5 and Comparative Examples 1, 3 and 4).
(2) The molded amide resin products of the present invention have excellent rigidity in the state of water absorption (Examples 1-5 and Comparative Examples 1, 2, 3 and 5).
(3) The molded amide resin products of the present invention have a low coefficient of expansion upon water absorption and have excellent dimensional stability (Examples 1-5, and Comparative Examples 1, 2, 3 and 5).
(4) The molded amide resin products of the present invention have excellent heat resistance.
(5) The molded amide resin products of the present invention have excellent surface outer appearance (Examples 1-5, and Comparative Example 3)
(6) The molded amide resin products of the present invention are excellent in all the above-mentioned properties, and the products in Comparative Examples are inferior in at least one of such properties.

EXAMPLE 7

A molded product was prepared in the same manner as in Example 1 except that Aromatic nylon-APO IV was used instead of Aromatic nylon-APO I in Example 1.

The molded product thus obtained was tested for physical properties. The results are shown in Table 2.

EXAMPLE 8

A molded product was prepared in the same manner as in Example 2 except that Aromatic nylon-APO IV was used instead of Aromatic nylon-APO I in Example 2.

The molded product thus obtained was tested for physical properties. The results are shown in Table. 2.

EXAMPLE 9

A molded product was prepared in the same manner as in Example 2 except that Aromatic nylon-APO IV was used instead of Aromatic nylon-APO I in Example II.

The molded product thus obtained was tested for physical properties. The results are shown in Table 2.

EXAMPLE 10

A molded product was prepared in the same manner as in Example 1 except that Aromatic nylon-APO V was used instead of Aromatic nylon-APO I in Example 1.

The molded product thus obtained was tested for physical properties. The results are shown in Table 2.

COMPARATIVE EXAMPLE 6

A molded product was prepared in the same manner as in Example 8 except that an Aromatic nylon having no modified polyolefin dispersed therein (prepared by polycondensation of three components of terephthalic acid, isophthalic acid and bis-(3-methyl-4-aminocyclohexyl)methane in a weight ratio of 33/17/50) was used instead of Aromatic nylon-APO IV in Example 8.

The molded product thus obtained was tested for physical properties. The results are shown in Table 2.

TABLE 2

|  |  | Ex. 8 | Ex. 9 | Ex.10 | Com. Ex. 6 |
|---|---|---|---|---|---|
| Aromatic nylon-APO IV |  | 33 | 33 | — | — |
| Aromatic nylon-APO V |  | — | — | 33 | — |
| Aromatic nylon *2 |  | — | — | — | 33 |
| Dupont impact value (kg.cm) |  | 10 | 15 | 23 | 2 |
| Flexural modulus | // *3 | 1.9 | 2.7 | 2.7 | 2.7 |
| (kg/cm²) | ⊥ *4 | 1.9 | 2.7 | 2.6 | 2.6 |
| Heat resistance (heat sag) (mm) |  | 1.4 | 1.1 | 1.3 | 0.8 |
| WA Expansion (%) | // | 0.5 | 0.3 | 0.2 | 0.2 |
|  | ⊥ | 0.5 | 0.3 | 0.2 | 0.2 |
| Porosity (%) |  | 5.3 | 5.3 | 5.3 | 5.3 |
| Surface outer appearance |  | ◎ | ◎ | ◎ | ◎ |

It is evident from Table 2 that the molded amide resin products of the present invention are excellent in the impact resistance, the rigidity and the heat resistance and have a low coefficient of expansion upon water absorption, and thus they have excellent dimensional stability. The product of the Comparative Example is inferior substantially in the impact resistance.

EXAMPLE 11

A molded product was prepared in the same manner in Example 1 except that Aromatic nylon-APO VI was used instead of Aromatic nylon-APO I in Example 1.

The molded product thus obtained was tested for physical properties. The results are shown in Table 3.

EXAMPLE 12

A molded product was prepared in the same manner as in Example 2 except that Aromatic nylon-APO VI was used instead of Aromatic nylon-APO I in Example 2.

The molded product thus obtained was tested for physical properties. The results are shown in Table 3.

EXAMPLE 13

A molded product was prepared in the same manner as in Example 3 except that Aromatic nylon-APO VI was used instead of Aromatic nylon-APO I in Example 3.

The molded product thus obtained was tested for physical properties. The results are shown in Table 3.

EXAMPLE 14

A molded product was prepared in the same manner as in Example 4 except that Aromatic nylon-APO VI was used instead of Aromatic nylon-APO I in Example 4.

The molded product thus obtained was tested for physical properties. The results are shown in Table 3.

EXAMPLE 15

A molded product was prepared in the same manner as in Example 2 except that Aromatic nylon-APO VII was used instead of Aromatic nylon-APO I in Example 2.

The molded product thus obtained was tested for physical properties. The results are shown in Table 3.

EXAMPLE 16

A molded product was prepared in the same manner as in Example 1 except that Aromatic nylon-APO VIII was used instead of Aromatic nylon-APO I in Example 1.

The molded product thus obtained was tested for physical properties. The results are shown in Table 3.

TABLE 3

|  | Ex. 11 | Ex. 12 | Ex. 13 | Ex. 14 | Ex. 15 | Ex. 16 | Com. Ex. 5 |
|---|---|---|---|---|---|---|---|
| Aromatic nylon-APO VI | 33 | 33 | 20 | 40 | — | — | — |
| Aromatic nylon-APO VII | — | — | — | — | 33 | — | — |
| Aromatic nylon-APO VIII | — | — | — | — | — | 33 | — |
| Dupont impact value (kg.cm) | 21 | 24 | 9 | 28 | 24 | 34 | 3 |
| Flexural modulus // *3 (kg/cm$^2$) | 1.8 | 2.5 | 2.2 | 3.1 | 2.4 | 2.2 | 1.3 |
| ⊥ *4 | 1.8 | 2.5 | 2.2 | 3.0 | 2.4 | 2.2 | 1.2 |
| WA Expansion (%) // *3 | 0.6 | 0.3 | 0.6 | 0.2 | 0.3 | 0.4 | 1.4 |
| ⊥ *4 | 0.6 | 0.3 | 0.6 | 0.2 | 0.3 | 0.3 | 1.4 |
| Porosity (%) | 5.3 | 5.3 | 5.3 | 5.3 | 5.3 | 5.3 | 5.3 |
| Surface outer appearance | ◉ | ◉ | ◉ | ◉ | ◉ | ○ | ○ |

Note: *3 and *4 are as defined in Table 1.

From Table 3, the following are evident
(1) The molded amide resin products of the present invention have excellent impact resistance at low temperatures.
(2) The molded amide resin products of the present invention are excellent in the rigidity in the state of water absorption.
(3) The molded amide resin products of the present invention have low coefficients of expansion upon water absorption and thus are excellent in the dimensional stability.
(4) The molded amide resin products of the present invention have excellent surface outer appearance.

EXAMPLE 17

A molded product was prepared in the same manner as in Example 1 except that the compositions of components A and B were changed as identified below.

| Component A: | |
|---|---|
| ε-caprolactam | 35.3 wt % |
| Sodium pyrroridone | 0.7 wt % |
| Aliphatic nylon-APO I | 8 wt % |
| Component B: | |
| Terephthaloylbiscaprolactam | 1.5 wt % |
| ε-caprolactam | 37.5 wt % |
| Aliphatic nylon-APO I | 25 wt % |

The molded product thus obtained was tested for physical properties. The results are shown in Table 4.

EXAMPLE 18

A molded product was prepared in the same manner as in Example 1 except that the compositions of components A and B were changed as identified blow.

| Component A: | |
|---|---|
| ε-caprolactam | 33 wt % |
| Bromo magnesium caprolactam | 3 wt % |
| Aliphatic nylon-APO I | 5 wt % |
| Component B: | |
| ε-caprolactam | 37.5 wt % |
| Isophthaloylbiscaprolactam | 1.5 wt % |
| Aliphatic nylon-APO I | 20 wt % |

The molded product thus obtained was tested for physical properties. The results are shown in Table 4.

EXAMPLE 19

A molded product was prepared in the same manner as in Example 17 except that the compositions of components A and B in Example 17 were changed as identified below.

| Component A: | |
|---|---|
| ε-caprolactam | 33 wt % |
| Bromo magnesium caprolactam | 3 wt % |
| Aliphatic nylon-APO I | 5 wt % |
| Component B: | |
| ε-caprolactam | 47.5 wt % |
| Isophthaloylbiscaprolactam | 1.5 wt % |
| Aliphatic nyon-APO I | 10 wt % |

The molded product thus obtained was tested for physical properties. The results are shown in Table 4.

EXAMPLE 20

A molded product was prepared in the same manner as in Example 17 except that the compositions of components A and B were changed as identified below.

| Component A: | |
|---|---|
| ε-caprolactam | 28 wt % |
| Bromo magnesium caprolactam | 3 wt % |
| Aliphatic nylon-APO I | 5 wt % |
| Component B: | |
| ε-caprolactam | 37.5 wt % |
| Isophthaloylbiscaprolactam | 1.5 wt % |

| | |
|---|---|
| Aliphatic nylon-APO I | 25 wt % |

The molded product thus obtained was tested for physical properties. The results are shown in Table 4.

EXAMPLE 21

A molded product was prepared in the same manner as in Example 18 except that Aliphatic nylon-APO II was used instead of Aliphatic nylon-APO I in Example 18.

The molded product thus obtained was tested for physical properties. The results are shown in Table 4.

COMPARATIVE EXAMPLE 7

A molded product was prepared in the same manner as in Example 17 except that the compositions of components A and B were changed as identified below.

| | |
|---|---|
| Component A: | |
| ε-caprolactam | 39.3 wt % |
| Sodium pyrrolidone | 0.7 wt % |
| Component B: | |
| ε-caprolactam | 48.5 wt % |
| Terephthaloylbiscaprolactam | 1.5 wt % |
| Polypropylene glycol | 10 wt % |
| (Molecular weight: 2,000) | |

The molded product thus obtained was tested for physical properties. The results are shown in Table 4.

COMPARATIVE EXAMPLE 8

A molded product was prepared in the same manner as in Example 17 except that the compositions of components A and B were changed as identified below.

| | |
|---|---|
| Component A: | |
| ε-caprolactam | 47 wt % |
| Bromo magnesium caprolactam | 3 wt % |
| Component B: | |
| ε-caprolactam | 27.7 wt % |
| Polymerization cocatalyst (X) | 22.3 wt % |

Here, the polymerization cocatalyst (X) is a compound of the the formula:

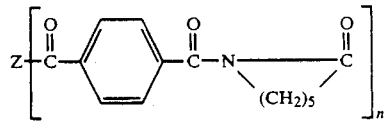

wherein Z is a polyether having a molecular weight about 6,000, and n is an integer of at least 2 with an average of 2.3.

The molded product thus obtained was tested for physical properties. The results are shown in Table 4.

COMPARATIVE EXAMPLE 9

A molded product was prepared in the same manner as in Example 17 except that the compositions of components A and B in Example 17 were changed as identified below.

| | |
|---|---|
| Component A: | |
| ε-caprolactam | 38 wt % |
| Bromo magnesium caprolactam | 2 wt % |
| Component B: | |
| ε-caprolactam | 14.4 wt % |
| polymerizaton cocatalyst | 15.6 wt % |
| Milled glass fiber | 30 wt % |

Here, the milled glass fiber is the same fiber as used in Comparative Example 3.

The molded product thus obtained was tested for physical properties. The results are shown in Table 4.

COMPARATIVE EXAMPLE 10

A molded product was prepared in the same manner as in Example 18 except that ε-caprolactam was used instead of Aliphatic nylon-APO I in Example 18.

The molded product thus obtained was tested for physical properties. The results are shown in Table 4.

TABLE 4

| | Ex. 17 | Ex. 18 | Ex. 19 | Ex. 20 | Ex. 21 | Com. Ex. 7 | Com. Ex. 8 | Com. Ex. 9 | Com. Ex. 10 |
|---|---|---|---|---|---|---|---|---|---|
| Aliphatic nylon-APO I | 33 | 25 | 15 | 30 | — | — | — | — | — |
| Aliphatic nylon-APO II | — | — | — | — | 33 | — | — | — | — |
| Polypropylene glycol | — | — | — | — | — | 10 | — | — | — |
| Polymerization cocatalyst (X) | — | — | — | — | — | — | 22.3 | 15.6 | — |
| Milled glass fiber *1 | — | — | — | — | — | — | — | 30 | — |
| Dupont impact value (kg.cm) | 25 | 28 | 12 | 35 | 50 | 22 | 25 | 2 | 3 |
| Flexural modulus  // *3 (kg/cm²) | 1.0 | 1.3 | 1.3 | 1.3 | 1.1 | 0.6 | 0.8 | 1.7 | 1.3 |
| ⊥ *4 | 1.0 | 1.2 | 1.2 | 1.3 | 1.0 | 0.6 | 0.8 | 1.1 | 1.2 |
| Porosity (%) | 5.3 | 5.3 | 5.3 | 5.3 | 5.3 | 5.3 | 5.3 | 5.3 | 5.3 |
| Surface outer appearance | ◎ | ◎ | ◎ | ◎ | ◎ | ○ | ○ | △ | ○ |

Note:
*1 and *4 are as defined in Table 1.

From Table 4, the following are evident.

(1) The molded amide resin products of the present invention have excellent impact resistance at low temperatures (Examples 17-21 and Comparative Example 9).

(2) The molded amide resin products of the present invention are excellent in the rigidity in a state of water absorption (Examples 17-21 and Comparative Examples 7 and 8)

(3) The molded amide resin products of the present invention have excellent surface outer appearance (Examples 7 and 8).

(4) The molded amide resin products of the present invention are excellent in all of the above properties, whereas the products of the Comparative Examples are inferior in at least one of such properties.

What is claimed is:

1. A method for preparing a molded amide resin product, comprising the steps of:
    (a) adding a polymerizing catalyst to a ω-lactam and heating and the mixture produced to form a ω-lactam melt A;
    (b) adding a polymerization cocatalyst to an ω-lactam and heating the mixture produced to form an 107-lactam melt B;
    (c) dispersing by dry blending a modified polyolefin in particulate form into a polyamide, said modified polyolefin being selected from the group consisting of (i) polyolefins or olefindiene copolymers graft-polymerized with maleic anhydride, (ii) ethylene/α,β-unsaturated carboxylic acid copolymers, and (iii) mixtures thereof, wherein 0-100% of the carboxylic acid groups in said ethylene/α,β-unsaturated carboxylic acid copolymer are neutralized with a metal ion, and wherein said polyamide is soluble in a molten ω-lactam, to form a polyamide/modified polyolefin mixture;
    (d) adding said polyamide/modified polyolefin mixture to said melt A or melt B;
    (e) mixing the melt A and melt B produced from step (d), such that the polyamide having the modified polyolefin dispersed therein is present in an amount of 1 to 50% by weight relative to 100% by weight of the total of A and B and the polyamide having the modified polyolefin dispersed therein, and
    (f) injecting the mixture so produced into a mold, followed by molding.

2. The method according to claim 1, wherein the polyamide soluble in a molten ω-lactam is an aromatic polyamide which is a polycondensation product of a dicarboxylic acid with a diamine and which contains an aromatic group in at least one of the dicarboxylic acid and the diamine.

3. The method according to claim 2, wherein the aromatic polyamide is a polycondensation product of isophthalic acid or terephthalic acid and bis(3-methyl-4-amino-cyclohexyl)methane and/or hexamethylenediamine.

4. The method according to claim 1, wherein the polyamide soluble in a molten ω-lactam is an aliphatic polyamide copolymer of a polycondensation product of at least three compound components selected from at least three groups selected from the following four groups of compounds for constituting a polyamide:
    (a) aliphatic dicarboxylic acids,
    (b) aliphatic diamines,
    (c) aminocarboxylic acids, and
    (d) lactams.

5. The method of claim 1, wherein said polyamide/modified polyolefin is added to both said melt A and said melt B in step (d).

6. The method of claim 5 wherein the polyamide having the modified polyolefin dispersed therein is present in an amount of 15 to 40% by weight relative to 100% by weight of a total of A and B and the polyamide having the modified polyolefin dispersed therein.

* * * * *